A. D. MORRIS.
TIRE.
APPLICATION FILED AUG. 25, 1913.
1,182,297. Patented May 9, 1916.
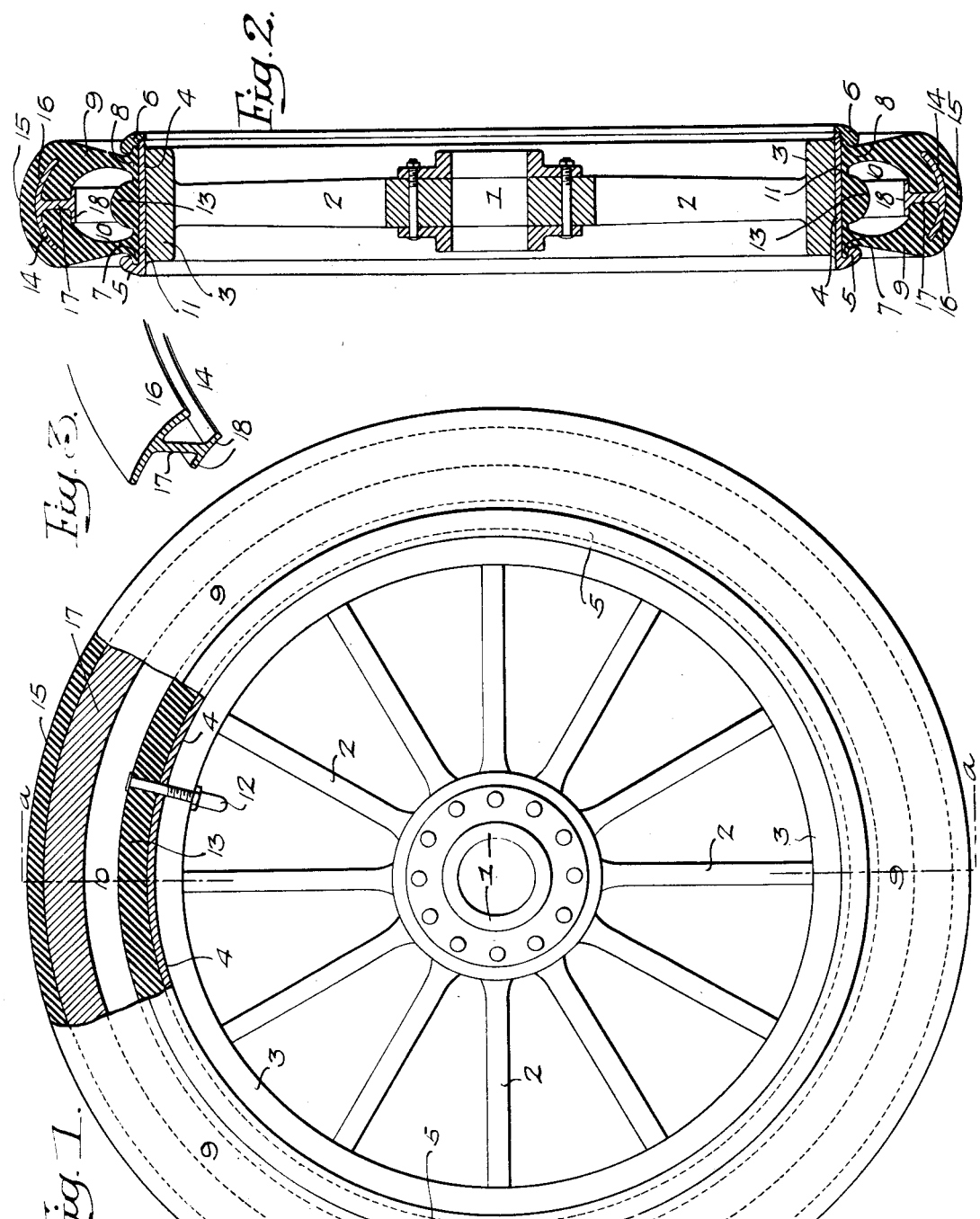

UNITED STATES PATENT OFFICE.

ALFRED D. MORRIS, OF PHILADELPHIA, PENNSYLVANIA.

TIRE.

1,182,297. Specification of Letters Patent. Patented May 9, 1916.

Application filed August 25, 1913. Serial No. 786,518.

*To all whom it may concern:*

Be it known that I, ALFRED D. MORRIS, a citizen of the United States, residing in Philadelphia, Pennsylvania, have invented certain Improvements in Tires, of which the following is a specification.

My invention consists of an improved form of resilient tire for vehicle wheels.

One object of my invention is to produce a rubber or similarly resilient tire which will be capable of supporting heavy loads, and which will be durable as well as simple in construction. These objects and other advantageous ends I attain as hereinafter set forth, reference being had to the accompanying drawings, in which:—

Figure 1, is a side elevation, partly in section, of a wheel provided with a tire made in accordance with my invention; Fig. 2, is a section taken on the line $a$—$a$, Fig. 1; and Fig. 3, is a perspective view of a portion of a ring forming a part of my invention.

In the above drawings, 1 is the hub, 2 the spokes, and 3 the felly of a wheel of suitable construction. A rim 4 is securely mounted on the felly 3 and has an integral annular bead 5 on one edge and an integral or detachable bead 6 at its other edge as may be desired. These beads respectively engage the lips 7 and 8 of the tire 9 and hold the latter to the rim 4.

The tire 9 is preferably made of rubber reinforced in any desired manner with canvas or other suitable material and is provided with an air chamber 10 extending circumferentially thereof. The base portion 11 of the tire is preferably made continuous between the two lips 7 and 8 so that the air chamber 10 is entirely closed, and said portion is projected into said chamber to form an annular cushion 13 as shown in Fig. 2.

A ring or hoop 14 made of compressed fiber or other rigid material is embedded within the tire adjacent its tread portion 15 and this ring is substantially T-shape in cross section; the outer face of its annular head portion 16 being preferably circular in section to be more or less closely parallel with the tread surface. A central rib 17 extends inwardly from this head portion 16 and terminates in a double laterally flanged portion 18 extending into the chamber 10, which may be inflated through a valve 12 as shown in Fig. 1.

By having the rigid ring 14 secured within the tire adjacent the tread thereof, any load will be partly carried by the said ring and distributed circumferentially over a large portion of the tire, while the remainder is taken by the sides of the tire. As a result of this distribution of load, the work of the tire is not concentrated on a small part thereof in contact with the ground, but is divided throughout its body and sides in a manner which materially increases its useful life. A tire constructed in accordance with my invention therefore is not liable to injury or rapid wear, while the likelihood of "rim-cutting" and cracking is reduced to a minimum. Moreover, the head portion 16 acts as a guard to prevent puncture through the tread 15 into the chamber 10, since any object passing through said tread will be stopped by said head.

It is to be noted that the cushion 13 acts as a reinforcement to the continuous base 11 to retain the lips of the tire within the beads of the rim and also serves to resiliently support the ring 14 and tread portion if the load on the tire is such as to cause the portion 18 to engage said cushion in spite of the resistance offered by the compressed air in the chamber 10 and the sides of the tire.

If desired, the valve 12 may be omitted and the tire used as a "cushion tire," without departing from my invention.

I claim:—

The combination of a resilient tire having an annular air chamber therein; and a relatively rigid ring embedded within said tire, said ring being substantially T-shaped in cross section and having its head portion extending circumferentially between the chamber and the tread surface of the tire, the inner portion of said ring extending into and being exposed within said chamber; and the tire including an integral annular cushion portion projecting into the air chamber in a position to be engaged by said inner portion of the ring under predetermined conditions.

In testimony whereof, I have signed my name to this specification, in the presence of two subscribing witnesses.

ALFRED D. MORRIS.

Witnesses:
AUGUSTUS B. COPPES,
WM. A. BARR.